United States Patent
Tabasso et al.

(10) Patent No.: US 8,537,537 B2
(45) Date of Patent: Sep. 17, 2013

(54) COMFORTABLE LAPTOP COMPUTER STAND

(75) Inventors: Alain Tabasso, Essertines (CH); Simone Chevalley, Lausanne (CH); Patrick Monney, Mex (CH)

(73) Assignee: Logitech Europe S.A., Romanel-sur-Morges (CH)

( * ) Notice: Subject to any disclaimer, the term of this patent is extended or adjusted under 35 U.S.C. 154(b) by 155 days.

(21) Appl. No.: 12/795,531

(22) Filed: Jun. 7, 2010

(65) Prior Publication Data

US 2011/0038121 A1  Feb. 17, 2011

Related U.S. Application Data

(60) Provisional application No. 61/184,997, filed on Jun. 8, 2009.

(51) Int. Cl.
*H05K 7/20* (2006.01)
*H05K 5/00* (2006.01)
*A47B 91/00* (2006.01)

(52) U.S. Cl.
USPC ............... 361/679.48; 361/679.55; 361/695; 361/679.41; 454/184; 165/80.2; 248/678; 248/346.01; 248/176.2

(58) Field of Classification Search
USPC ............ 361/679.01, 679.41, 679.46, 679.48, 361/679.55, 695, 688; 165/80.2; 454/184
See application file for complete search history.

(56) References Cited

U.S. PATENT DOCUMENTS

| | | | |
|---|---|---|---|
| 599,799 | A | 3/1898 | Scott |
| 668,826 | A | 2/1901 | Wade |
| 1,623,196 | A | 4/1927 | Neahr |
| 1,889,501 | A | 11/1932 | Schnake |
| 3,476,254 | A | 11/1969 | Gaffney |
| 3,746,296 | A | 7/1973 | Dean et al. |
| 4,073,460 | A | 2/1978 | Dale |
| 4,349,173 | A | 9/1982 | Volka et al. |
| D274,730 | S | 7/1984 | Hovey et al. |
| 4,708,308 | A | 11/1987 | Snider |
| 5,143,341 | A | 9/1992 | Juster |
| 5,234,186 | A | 8/1993 | Powell |
| D358,144 | S | 5/1995 | Masaaki |

(Continued)

FOREIGN PATENT DOCUMENTS

| | | |
|---|---|---|
| JP | 11-143583 A | 5/1999 |
| JP | 2000-10664 A1 | 1/2000 |
| WO | WO2007/029937 | * 3/2007 |

*Primary Examiner* — Zachary M Pape
(74) *Attorney, Agent, or Firm* — Kilpatrick Townsend & Stockton LLP

(57) ABSTRACT

A laptop computer stand includes a case having a top, a bottom, right and left sides, a front, and a back. The stand further includes a plurality of speakers disposed at right and left sides of the top, and an audio hub coupled to the speakers. The audio hub is configured to receive audio signals from a laptop computer coupled to the audio hub, and control the speakers to output audio from the audio signal. The stand further includes a cooling fan disposed in the body below the top. The top includes a top grate formed therein configured to output air blown by the fan, and the back includes a back grate configured to intake air blown out the top grate. The air blown by the fan is configured to circulate between the top of the stand and the bottom of a laptop computer positioned on the top of the stand.

18 Claims, 7 Drawing Sheets

(56) References Cited

U.S. PATENT DOCUMENTS

| | | | |
|---|---|---|---|
| D358,381 S | 5/1995 | Merino | |
| 5,436,792 A | 7/1995 | Leman et al. | |
| 5,461,546 A | 10/1995 | Kobayashi et al. | |
| 5,552,960 A | 9/1996 | Nelson et al. | |
| 5,597,218 A | 1/1997 | Lechman | |
| 5,627,450 A | 5/1997 | Ryan et al. | |
| 5,822,185 A | 10/1998 | Cavello | |
| 5,871,094 A | 2/1999 | Leibowitz | |
| 5,893,540 A * | 4/1999 | Scott | 248/118 |
| D414,166 S | 9/1999 | De Paris | |
| 6,094,347 A | 7/2000 | Bhatia | |
| 6,115,249 A | 9/2000 | Cipolla et al. | |
| 6,181,554 B1 | 1/2001 | Cipolla et al. | |
| 6,185,096 B1 | 2/2001 | Helot et al. | |
| 6,239,971 B1 | 5/2001 | Yu et al. | |
| 6,256,193 B1 | 7/2001 | Janik et al. | |
| 6,259,601 B1 | 7/2001 | Jaggers et al. | |
| 6,414,842 B1 | 7/2002 | Cipolla et al. | |
| 6,437,978 B1 | 8/2002 | Ozaki et al. | |
| 6,459,573 B1 | 10/2002 | DiStefano et al. | |
| 6,474,614 B2 | 11/2002 | MacEachern | |
| 6,511,039 B1 | 1/2003 | Nash | |
| 6,527,241 B1 | 3/2003 | Lord | |
| 6,568,650 B2 | 5/2003 | Helmetsie et al. | |
| 6,604,720 B1 | 8/2003 | Wilson | |
| 6,682,040 B1 | 1/2004 | MacEachern | |
| 6,819,548 B2 | 11/2004 | Hillis et al. | |
| 6,913,238 B2 | 7/2005 | Bakker et al. | |
| 7,327,560 B1 | 2/2008 | Tabasso et al. | |
| 7,333,327 B1 * | 2/2008 | Ho et al. | 361/679.55 |
| 7,830,661 B2 * | 11/2010 | Sween et al. | 361/695 |
| 7,859,836 B2 * | 12/2010 | Bae | 361/679.55 |
| 7,980,526 B2 * | 7/2011 | Lord et al. | 248/444 |
| 2001/0003166 A1 * | 6/2001 | Gulick | 700/94 |
| 2003/0231466 A1 * | 12/2003 | Huang | 361/687 |
| 2005/0211498 A1 * | 9/2005 | Osada et al. | 181/156 |
| 2007/0258206 A1 * | 11/2007 | Huang | 361/687 |

* cited by examiner

COMFORTABLE LAPTOP COMPUTER STAND

CROSS REFERENCE TO RELATED APPLICATIONS

This application claims priority to, and the benefit of, U.S. Provisional Patent Application No. 61/184,997, filed Jun. 8, 2009, titled "Comfortable Laptop Computer Stand," of Alain Tabasso et al. and is incorporated by reference in its entirety for all purposes.

BACKGROUND OF THE INVENTION

The present invention generally relates to laptop computer stands. More specifically, some embodiments of the present invention relates to a laptop computer stand having an audio hub and an integrated cooling device.

The use of a laptop computer on a user's lap tends to build up heat on the user's lap rendering such use of the laptop computer uncomfortable. Further, use of the laptop computer in other locations, such as on a chair or couch, tends to build up heat in the laptop computer. Laptop stands for laptop computers are devices that hold a laptop computer for ease of use of the laptop computer. These laptop stands are often configured for a variety of uses. For example, a first type of laptop stand is configured for use on a person's lap to inhibit heat transfer from the supported laptop computer to the user's legs. In this way, these laptop stands operate as heat barriers. Often these laptop stands also include heat transfer devices, such as fans and vents, which are configured to move heat away from a laptop computer and provide fresh air to the laptop computer. Another type of laptop stands for laptop computers are fixed devices that are configured for desktop use and support a laptop computer at a fixed angle for comfortable use. Still another type of laptop stand for laptop computers provides adjustable platens so that user may set a comfortable angle for use of a laptop computer. These laptop stands are configured to provide improved comfort while a user uses her laptop computer.

Manufacturers of laptop stands continue to strive to develop new laptop stands that are slim for easy transport, easy use, and provide multiple angular settings for comfortable laptop computer use, and have added functionality such as audio hubs.

BRIEF SUMMARY OF THE INVENTION

The present invention generally relates to a laptop computer stand. More specifically, some embodiments of the present invention relates to a laptop computer stand having an audio hub and an integrated cooling device.

According to a specific embodiment of the present invention, the laptop computer stand (sometimes referred to as a lapdesk) includes a case having a top, a bottom, right and left sides, a front, and a back. The laptop computer stand also includes a plurality of speakers disposed at right and left sides of the top. An audio hub is coupled to the speakers and is configured to receive audio signals from a laptop computer coupled to the audio hub and control the speakers to output audio from the audio signal. According to one specific embodiment, a cooling fan is disposed in the body below the top. The top includes a top grate formed therein configured to output air blown by the fan, and the back includes a back grate configured to intake air blown out the top grate. In one embodiment, a heat shield is also present. In one embodiment, there is no cooling fan, but a heat shield is present.

According to a specific embodiment, the audio hub includes a set of USB connectors configured to receive the audio signal from a laptop computer for output of the audio signal by the speakers and receive power from the laptop computer to power the audio hub and/or the cooling fan. The case includes a storage compartment for storing the set of USB connectors.

According to another specific embodiment, the audio hub includes a digital-to-analog converter, wherein the audio signal received from the laptop computer is a digital audio signal, and the digital-to-analog converter is configured to convert the digital audio signal to an analog audio signal for output by the plurality of speakers. The laptop computer stand may further include a control panel having a volume control device for raising and lowering a volume of sound output from the speakers, and having a power switch for powering the fan on and off. According to one embodiment, each of the speakers is at least a two inch speaker. In one embodiment, the main speakers are covered by a grid. In one embodiment, some or all of the speakers (e.g., the bass reflex speakers) are hidden under the main speakers grid.

According to another specific embodiment, the top is substantially planar, and wherein the bottom is contoured and the contour includes a first portion adjacent to the front that is relatively planar, a second portion adjacent to the first portion that is curved downward relative to the top, and a third portion adjacent to the second portion is relatively planar. The contour is configured to fit a user's lap and curve over a user's knees and provides that the back is taller than the front. With the bottom of the laptop computer stand disposed on a relatively planar work surface, the contour is configured to angle a laptop computer on the top toward the front.

According to another specific embodiment, the laptop computer stand further includes a plurality of pads coupled to the top, wherein the pads are formed of a material softer than a material of the top. The bottom may be a mesh surface.

A better understanding of the nature and advantages of the present invention may be gained with reference to the following detailed description and the accompanying drawings.

DETAILED DESCRIPTION OF THE INVENTION

The present invention generally provides a laptop computer stand. More specifically, some embodiments of the present invention provides a laptop computer stand having an audio hub and an integrated cooling device.

Figure 1A:
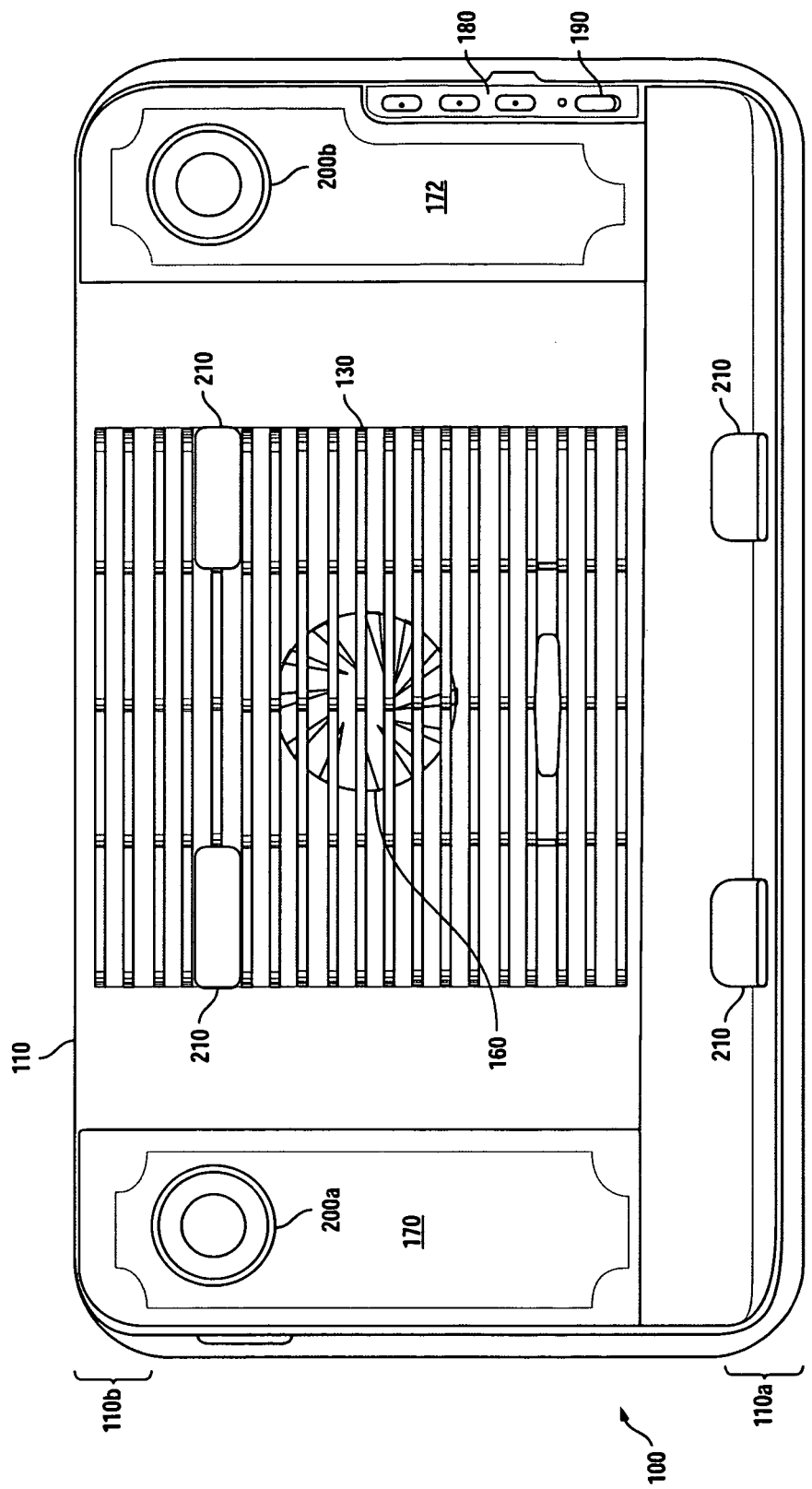
FIGS. 1A and 1B are respectively top and back views of a laptop stand 100 for a laptop computer according to one embodiment of the present invention.
Figure 1B:
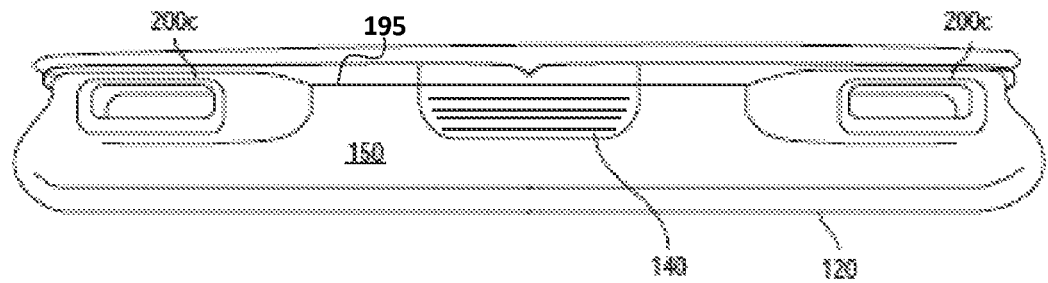
Figure 1C:
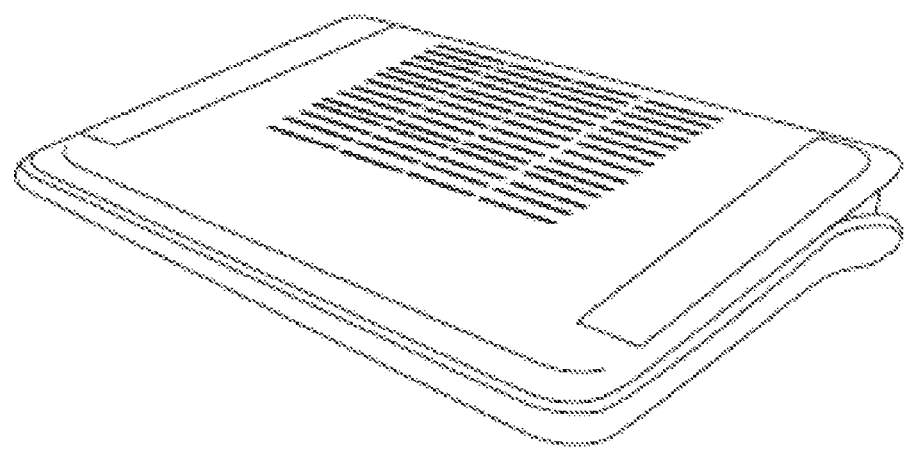
FIGS. 1C and 1D are respectively right and left overall perspective views of laptop stand 100 according to one embodiment of the present invention.
Figure 1D:
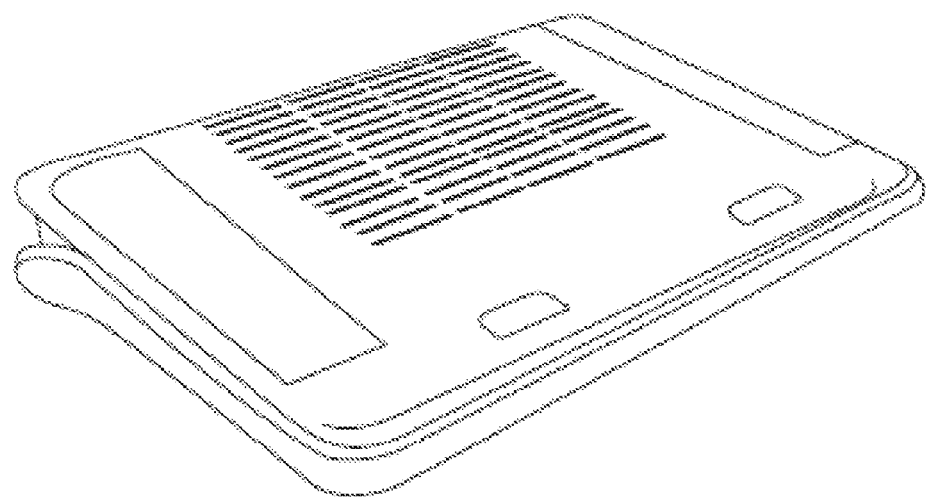
Figure 1E:
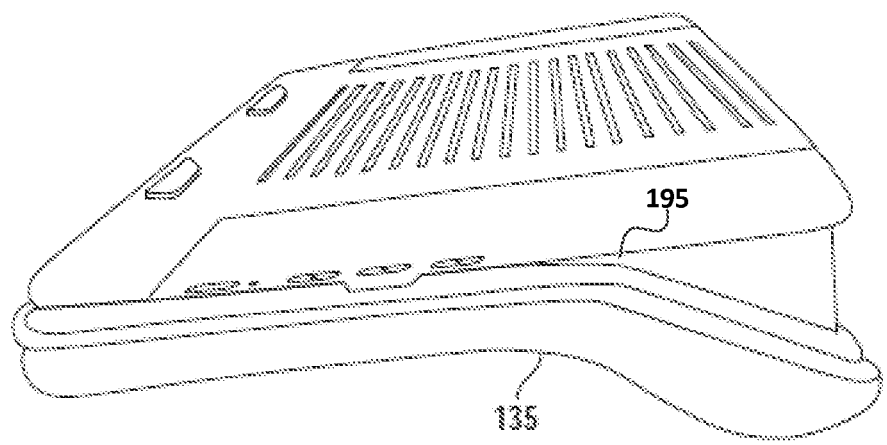
FIGS. 1E and 1F are respectively right and left side views of laptop stand 100 according to one embodiment of the present invention.
Figure 1F:
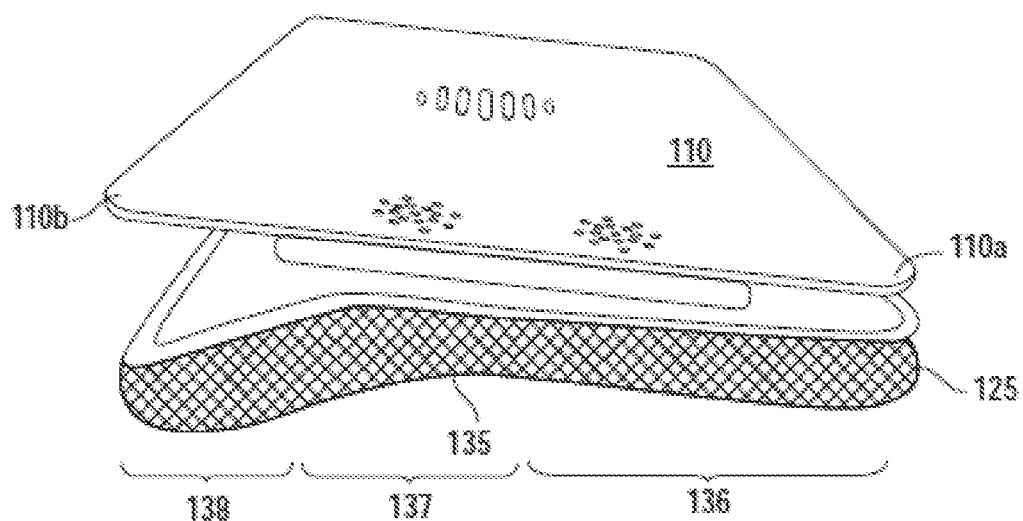
Figure 2:
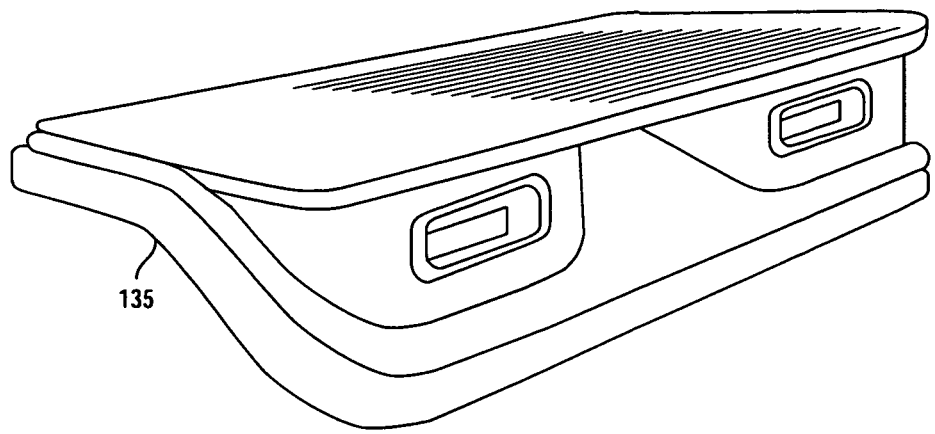
FIG. 2 is a back perspective view of the laptop stand.
Figure 3:
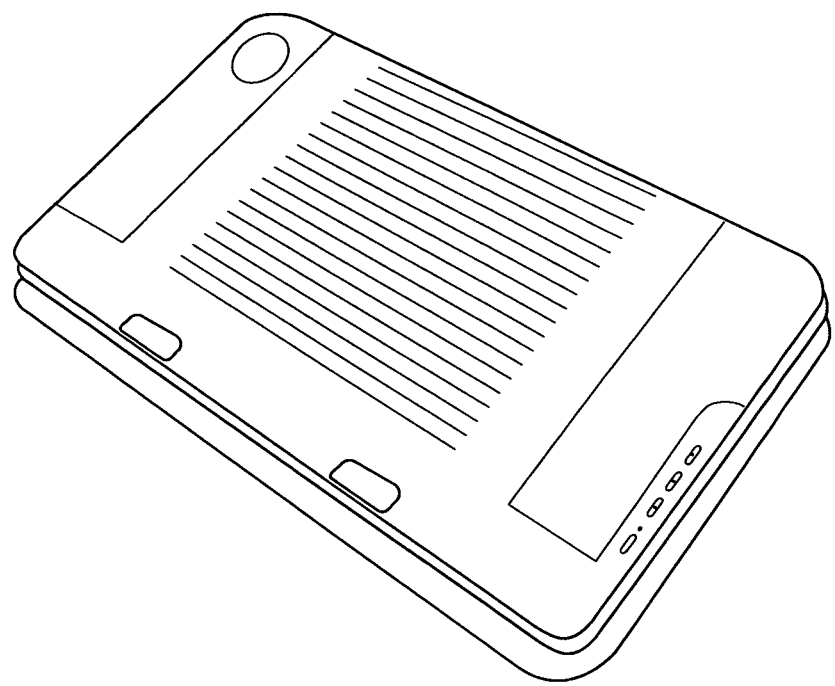
FIG. 3 is a top perspective view of the laptop stand.
Figure 4:
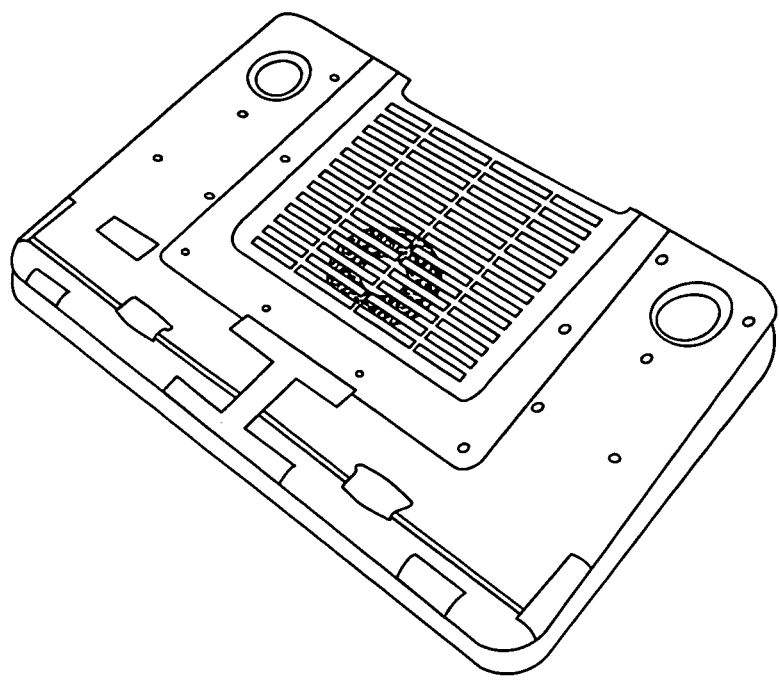
FIGS. 4-6 are various views of the laptop stand with a top of the stand removed to show internal elements and structures of the laptop stand.
Figure 5:
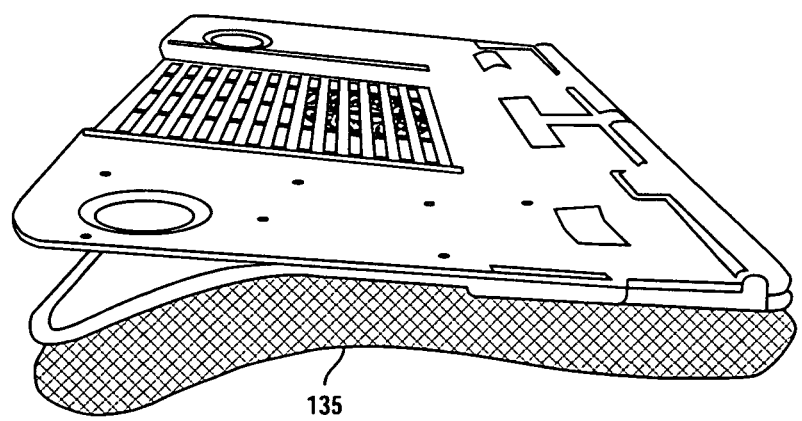
Figure 6:
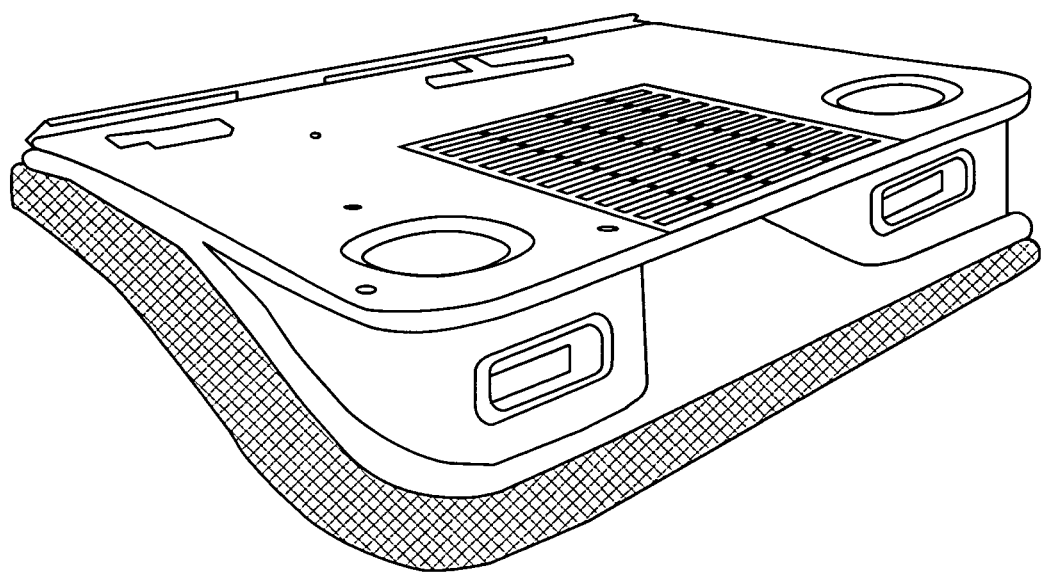
Figure 7:
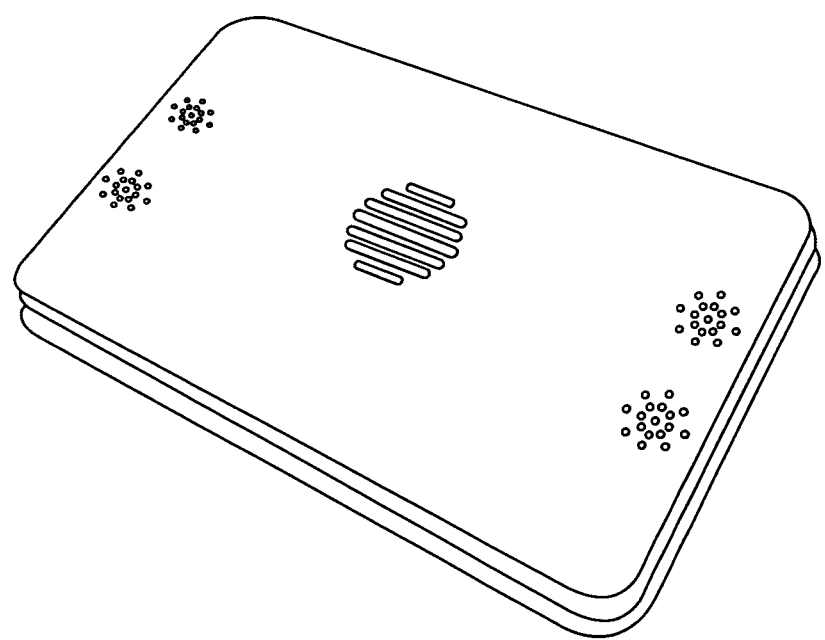
FIG. 7 is a top perspective view of the laptop stand according to one embodiment of the present invention.

FIGS. 1A and 1B are respectively a top view and a back view of a laptop stand 100 for a laptop computer according to one embodiment of the present invention. The laptop stand is also referred to sometimes herein as a cooling pad or a lap-desk. FIGS. 1C and 1D are respectively a right overall perspective view and a left overall perspective view of laptop stand 100 according to one embodiment of the present invention. FIGS. 1E and 1F are respectively a right side view and a left side view of laptop stand 100 according to one embodiment of the present invention. FIGS. 2-7 are diagrams of laptop stand 100 according to a variety of embodiments of the present invention. For example, FIG. 2 is a back perspective view of the laptop stand. FIG. 3 is a top perspective view of the laptop stand. FIGS. 4-6 are various views of the laptop stand with a top of the stand removed to show internal elements and structures of the laptop stand according to various embodiments of the present invention. The internal elements of laptop stand 100 shown in FIGS. 4-6 structures are described below. FIG. 7 is a top perspective view of the laptop stand according to one embodiment of the present invention.

Laptop stand 100 includes a top 110 on which a laptop computer is configured to be placed for use of the laptop stand and the laptop computer. The laptop stand further includes a bottom 120. The bottom is configured to sit on a user's lap, a work surface (e.g., a desktop), or the like for use. In one embodiment, laptop stand 100 has a heat shielding design. The bottom may include a mesh surface 125 formed of plastic, fabric, foam with mesh fabric covering, or the like. The mesh surface may be configured to allow air to circulate from the inside of the laptop stand to the outside of the laptop stand and from outside of the laptop stand to the inside. Thereby the mesh surface may be configured to allow heat to be moved from a person's lap so that heat does not build up, and thus serves as a heat shield. Other types of heat shields may also be used. Bottom 120 may have a contour 135 formed therein. Contour 135 may be relatively flat in a back portion 136 of the laptop stand and may be rounded downward toward a forward portion 137 of the laptop stand. Contour 135 may be relatively flat or curved in front portion 138 of the laptop stand. Contour 135 provides that the bottom of the laptop stand fits over a user's knees on a user's lap for securely holding the laptop stand on the user's lap. Contour 135 may also be configured to angle top 110 toward a front 110a of the laptop stand to angle a keyboard of a laptop computer on the laptop stand toward front 137 and toward a user using the laptop stand and laptop computer.

According to one embodiment, top 110 is hinge mounted 195 to the laptop stand. The hinge mounting is configured to allow the top 110 to be positioned at a variety of angles with respect to bottom 120. The hinge mounting provides that the keyboard of a laptop computer placed on the laptop stand may be positioned at a variety of angles for comfortable use for the user. The hinge mounting may be configured to provide that the front 110b of the top may be moved upward with respect to the back 110a.

According to one embodiment, laptop stand 100 includes a top grate 130 formed in top 110. The laptop stand may further include a back grate 140 formed in a back 150 of the laptop stand. The top grate and back grate are configured to permit air to travel out of, and into, the laptop stand. A fan 160 is disposed in the laptop stand according to one embodiment of the present invention. Some embodiment of the present invention do not include a fan, but include a heat shield to shield heat from reaching the bottom of the laptop stand. The body of the laptop stand may be the shield or the body of the laptop stand may include additional heat shield elements. The fan may be mounted below the top grate, such that if the fan is turned on the fan is configured to circulate air between top 110 and the bottom of a laptop computer disposed on the top. One or both of the top grate and the back grate may be configured to provide ventilation for the fan. Providing a top grate and a back grate allows air to circulate through the laptop stand while the laptop stand is placed on a lap, a bed, a couch, a chair or the like, which might block air circulation associated with a single bottom grate included in the laptop stand. According to one embodiment, the laptop stand also includes a bottom grate, for example that is disposed in a central portion of the bottom of the laptop stand. As the fan is configured to circulate air between the top of the laptop stand and the bottom of the laptop computer, the fan is configured to inhibit the laptop computer from overheating, and cools the laptop computer. The top grate and back grate also inhibit heat from travelling from a laptop computer to a user's lap or the like. Fan 160 may be configured to draw air through the top grate away from a laptop computer and out from the back grate. Alternatively, fan 160 may be configured to draw air in through the back grate and/or the bottom grate and out from the top grate at a laptop computer on the laptop stand to cool that laptop computer and to inhibit the heat from the laptop computer from reaching a user's lap.

Figure 8:
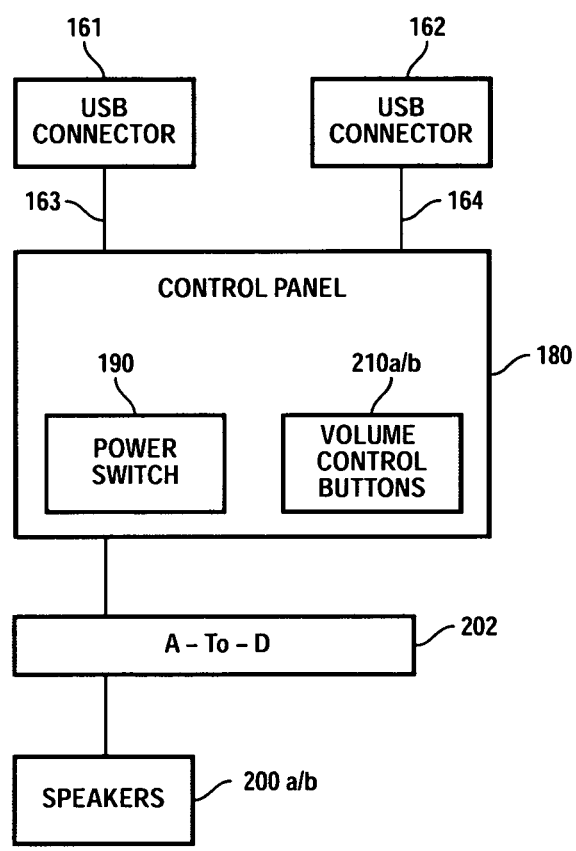
FIG. 8 is a simplified block diagram of a circuit 800 included in laptop stand 100 according to one embodiment of the present invention.

According to one embodiment of the present invention, laptop stand 110 may include left and/or right universal serial bus (USB) connectors 161 and 162 (see FIG. 8, which shows a simplified circuit diagram of the laptop stand) respectively coupled to left and right transmission wires 163 and 164. FIG. 8 is discussed below in further detail. Left USB connector 161 and left transmission wire 163 may be coupled to the left side of the laptop stand. Right USB connector 162 and the right transmission wire 164 may be coupled to the right side of the laptop stand of the laptop stand. The laptop stand may include a cable management system for storing the USB connectors and the transmission wires so that the USB connectors and transmission wires may be tucked into the laptop stand, retracted into the laptop stand, stored behind a door in the laptop stand, stored in the bottom of the laptop stand, etc. In one embodiment, the USB connectors and the transmission wires being configured to be retracted, stored behind a door, or the like, into the laptop stand provides for a uniform and clean appearance for the laptop stand. Providing a USB connector and a transmission wire along both the right side and the left side of the laptop stand provides that one of the USB connectors may be coupled to a nearest USB connector on a laptop computer, thereby substantially minimizing the length of transmission wire that extends from the laptop stand to a laptop computer during use, and further provides for a clean appearance of the laptop stand during use. While the USB connectors are described as being disposed along the left and right sides of the laptop stand, the USB connectors and cables may be disposed along the back of the laptop stand, such as along the back-left side of the laptop stand, and along the back-right side of the laptop stand, or may be disposed on the bottom of the laptop stand, such as on the bottom-left side and the bottom-right side of the laptop stand.

The left and the right USB connectors may be configured such that a USB connector of a laptop computer coupled to one or both of the USB connectors may be configured to supply power (e.g., voltage and current) to power fan 160. That is the 5 volt power supply of the USB connector on the laptop computer may power the fan via one or both of the USB connectors on the laptop stand. Fan 160 may be a relatively quite fan, such that when the fan is powered on, the fan is not audible to a user.

According to one embodiment, the laptop stand may include a control panel 180. The control panel may include a power switch 190 that is configured to power on and off the fan.

According to one embodiment of the present invention, the laptop stand includes a set of speakers 200. The set of speakers may include a left set of speakers 200a and a right set of speakers 200b, which may be disposed under a grid or the like formed in the top of the laptop stand. While FIG. 1 shows specifically shows that the laptop stand includes one left speaker and one right speaker, other embodiments of the laptop stand include more than two speakers. For example, a laptop stand according to one embodiment, includes two left speakers and two right speakers where one of the left speakers and one of the right speakers are configured to transmitting bass sounds, and the other of the left and the right speaker are configured to transmitting relatively higher frequency sounds. In one embodiment, some speakers are located towards the front of the laptop stand, while others are located towards the rear end of the laptop stand (further away from the user). The speakers may be relatively larger (for example 2 inch or larger speakers) than speakers included in a traditional laptop computer to provide relatively "better" sound than the speakers in the laptop computer. That is, the set of speakers may provide fuller bass notes, higher treble notes, and midrange sounds that are appropriately balanced with the bass and the treble. The set of left side speakers may be disposed under a cover 170, and the set of right side speakers may be disposed under a cover 172. In one embodiment, a single cover may cover front speakers, while another cover covers rear speakers. In another embodiment, a single cover may cover all speakers. In still another embodiment, the speakers are not covered. Each cover may include a plastic or metal mesh so that sound may be emitted un-muffled from the laptop stand. According to one embodiment of the present invention, covers 170 and 172 may be configured to be removed from the laptop stand for washing and for providing access to the speakers for cleaning. The covers being removable and washable provide that the laptop stand may be kept new in appearance. According to one embodiment, the laptop stand includes a set of speakers 200c, which are on back 150 of the laptop stand (see FIG. 1B). The set of speakers 200c may be bass reflex speakers, which are configured to favor bass output. While the bass reflex speakers are shown in FIG. 1B as being on the back of the laptop stand, the bass reflex speakers may be located on alternative positions on the laptop stand, such as at the top of the laptop stand under a grid or the like. The bass reflex speakers may be positioned adjacent to the sets of speakers 200a and 200b According to one embodiment, control panel 180 may include volume control buttons 201a and 201b to respectively raise and lower the volume of sound emitted from the speakers. While the volume control devices are referred to as buttons, other embodiments may include a volume control slider, a volume control knob, or the like. According to an alternative embodiment, the control panel may include a slider that is configured to raise and lower the volume of sound emitted by the speakers. Volume control buttons 201a and 201b or the slider may be coupled to the PCB for controlling volume. The speakers may be coupled to the PCB and may be powered by the PCB via the power supplied by the laptop stand's USB connectors. The USB connectors coupled to a laptop computer may also provide audio signal for playback on the speakers. According to one embodiment, power switch 190 in the control panel may be configured to turn the fan on and off without powering the speakers on and off or disrupting the flow of audio to the speakers. According to one embodiment of the present invention, covers 170 and 172 may be coupled to the laptop stand via soft and flexible seals (e.g., rubber) to inhibit the covers from rattling when the speakers are outputting sound. In one embodiment, there is no separate control panel 180. In such an embodiment, the speakers' volume etc. may be directly controlled from the laptop. This could be done, for instance, using either software on the laptop computer, or using the keys/buttons on the laptop computer. Also, in one such embodiment, there is no power switch for turning the fan on. The level of heating (e.g., the temperature) of the laptop computer and/or laptop stand may be detected (e.g., by a temperature detector disposed in or on the laptop stand), and the fan may be automatically turned on when the detected level of heat exceeds a certain threshold. In one such embodiment, the fan is only turned on when the heat shielding design proves insufficient to dissipate the heat.

FIG. 8 is a simplified block diagram of a circuit 800 included in laptop stand 100 according to one embodiment of the present invention. Circuit 800 may include control panel 180, which includes power switch 190 and volume control buttons 201a and 201b. Circuit 800 may also include the left and the right USB connectors 161 and 162 and may include the left and the right transmission wires 163 and 164. The circuit may include fan 160 and may include power switch 190, which is configured for turning on and turning off USB power for the fan. The circuit may also include speakers 200a and 200b. The circuit may also includes a digital-to-analog converter 202 that is configured to receive digital audio signals from a laptop computer via one of the USB connectors and convert the digital audio signals to an analog audio signal for use by the speakers. According to one embodiment, the USB connectors, the transmission wires, and the PCB are configured to be an audio hub for the laptop stand. One or more of the circuit elements described above may be disposed on a printed circuit board (PCB) 203, which may be included in the laptop stand. According to an alternative embodiment, the laptop stand includes an analog audio port (e.g., a mini jack), which is configured receive an analog audio signal from a laptop computer, such as from the laptop computer's mini jack. According to another alternative embodiment, for an embodiment of the laptop stand that includes an analog audio port, the laptop computer stand does not include a USB connector and uses an alternative power source for powering the fan, such as a set of batteries.

According to another embodiment of the present invention, the laptop stand includes a set of pads 210. The pads are configured to rise above the top of the laptop stand and physically contact a laptop computer placed on the laptop stand. The pads are configured to inhibit a laptop computer from sliding off of the laptop stand's top. According to one embodiment of the present invention, the pads may be configured to be raised or lowered as is needed to inhibit the laptop computer from sliding. The pads may be configured to be set at a plurality of heights to provide support for newer ultra-thin laptop computers and thicker traditional laptop computers. The pads may be formed of a relatively soft material, such as a soft plastic, rubber, or the like to inhibit the pads from scratching a laptop computer in contact with the pads and to further inhibit the laptop computer from sliding off of the laptop stand. According to another embodiment, the pads located adjacent to the front 110a of top 110 may be hinge coupled to the top, and may be configured to be opened towards the front 110a so that a laptop computer placed on the laptop computer stand may contact the pads to further inhibit the laptop computer from sliding off of the laptop computer stand.

According to one embodiment of the present invention, the top of the laptop computer may be textured plastic or the like. The textured plastic provides that an optical control device, such as a mouse, may be used across the top surface. Doors 170 and 172 may be formed of a material having a top surface texture that provides for mouse tracking across the doors and thereby across the entire top surface of the laptop stand.

It is to be understood that the examples and embodiments described above are for illustrative purposes only, and that various modifications or changes in light thereof will be suggested to persons skilled in the art and are to be included within the spirit and purview of this application and scope of the appended claims. For example, while one general form factor for the laptop stand is shown in the accompanying drawings, the laptop stand may have other form factors that are smaller, larger, etc. Therefore, the above description should not be understood as limiting the scope of the invention as defined by the claims.

What is claimed is:

1. A laptop computer stand comprising:
a case having a top, a bottom, right and left sides, a front, and a back, wherein the top is hinge mounted such that the top can be positioned at a variety of angles with respect to the bottom, wherein the top is substantially planar, and wherein the bottom is contoured and includes:
a first portion having a first front-end and a first back-end, the first front-end of the first portion being adjacent to the front, relatively planar and substantially parallel to the top;
a second portion having a second front-end and a second back-end, the second front end adjacent to the first back-end of the first portion, the second portion being curved downward from the second front-end to the second back-end and curved downward relative to the top; and
a third portion having a third front-end and a third back-end, the third front end adjacent to the second back-end of the second portion, the third portion being relatively planar and angled downward from the third front-end to the third back-end and angled downward relative to the top, wherein the contour is continuous across the first, second, and third portions;
a plurality of speakers disposed at right and left sides of the top; and
an audio hub coupled to the speakers and configured to receive audio signals from a laptop computer coupled to the audio hub and control the speakers to output audio from the audio signal.

2. The laptop computer stand of claim 1, further comprising a cooling fan disposed in the body below the top; wherein the top includes a top grate formed therein configured to output air blown by the fan, and the back includes a back grate configured to intake air blown out the top grate.

3. The laptop computer stand of claim 2, wherein the audio hub includes a set of USB connectors configured to receive the audio signal from a laptop computer for output of the audio signal by the speakers and receive power from the laptop computer to power the audio hub and the cooling fan.

4. The laptop computer stand of claim 2 further comprising a temperature detector disposed in the laptop computer stand and configured to detect a temperature of the laptop computer, wherein the cooling fan is configured to turn on automatically when a detected temperature exceeds a threshold.

5. The laptop computer stand of claim 1, wherein:
the audio hub includes a digital-to-analog converter,
the audio signal received from the laptop computer is a digital audio signal, and
the digital-to-analog converter is configured to convert the digital audio signal to an analog audio signal for output by the plurality of speakers.

6. The laptop computer stand of claim 1, further comprising a control panel having a volume control device for raising and lowering a volume of sound output from the speakers, and having a power switch for powering the fan on and off.

7. The laptop computer stand of claim 1, wherein each of the speakers is at least a two inch speaker.

8. The laptop computer stand of claim 1, wherein the contour is configured to fit a user's lap and curve over a user's knees.

9. The laptop computer stand of claim 1, wherein the back is taller than the front.

10. The laptop computer stand of claim 1, wherein with the bottom disposed on a relatively planar work surface, the contour is configured to angle a laptop computer on the top toward the front.

11. The laptop computer stand of claim 1, the bottom includes a mesh surface.

12. The laptop computer stand of claim 1, further comprising a plurality of pads coupled to the top, wherein the pads are formed of a material softer than a material of the top.

13. The laptop computer stand of claim 1, further comprising a heat shield configured to inhibit heat from passing from the top to the bottom.

14. The laptop computer stand of claim 1, wherein the audio hub includes an audio input port configured to receive analog audio signals from the laptop computer for output of the analog audio signals to the set of speakers.

15. The laptop computer stand of claim 14, wherein the audio input port is a mini jack.

16. The laptop computer stand of claim 1, wherein the set of the speakers includes a set of bass reflex speakers.

17. The laptop computer stand of claim 16, wherein the set of bass reflex speakers are at the back or the top.

18. A laptop computer stand comprising:
a case having a top, a bottom, right and left sides, a front, and a back, wherein the top is hinge mounted such that the top can be positioned at a variety of angles with respect to the bottom, wherein the top is substantially planar, and wherein the bottom is contoured and includes:
a first portion having a first front-end and a first back-end, the first portion being adjacent to the front and relatively planar and substantially parallel to the top;
a second portion having a second front-end and a second back-end, the second front end adjacent to the first back-end of the first portion, the second portion being curved downward from the second front-end to the second back-end and curved downward relative to the top; and
a third portion having a third front-end and a third back-end, the third front end adjacent to the second back-end of the second portion, the third portion being relatively planar and angled downward from the third front-end to the third back-end and angled downward relative to the top, wherein the contour is continuous across the first, second, and third portions.

* * * * *